United States Patent [19]

Iyoda et al.

[11] Patent Number: 5,446,276
[45] Date of Patent: Aug. 29, 1995

[54] IMAGE READER AND IMAGE READING METHOD

[75] Inventors: Tetsuo Iyoda; Ikken So; Takashi Ozawa, all of Kanagawa, Japan

[73] Assignee: Fuji Xerox Co., Ltd., Tokyo, Japan

[21] Appl. No.: 194,313

[22] Filed: Feb. 10, 1994

[30] Foreign Application Priority Data

Feb. 12, 1993 [JP] Japan ................................ 5-046103

[51] Int. Cl.$^6$ .................... H04N 1/04; H04N 1/028
[52] U.S. Cl. ................. 250/208.1; 358/494
[58] Field of Search ............ 250/208.1, 201.4, 201.5, 250/201.6, 201.7, 201.8; 358/494, 495, 496, 497

[56] References Cited

U.S. PATENT DOCUMENTS 5,089,901 2/1992 Kaneko ................... 250/208.1

FOREIGN PATENT DOCUMENTS

| | | |
|---|---|---|
| 59-36477 | 2/1984 | Japan . |
| 61-269572 | 1/1986 | Japan . |
| 1-180462 | 7/1989 | Japan . |
| 2-10309 | 1/1990 | Japan . |
| 2-82165 | 3/1990 | Japan . |
| 4-11470 | 1/1992 | Japan . |
| 4-21832 | 1/1992 | Japan . |
| 4-40746 | 2/1992 | Japan . |

OTHER PUBLICATIONS

"VTR Integrated with Camera, Compensation of Blurring by Prism and Angle Sensor," S. Ishizuka et al., Nikkei Electronics, Jul. 6, 1992, No. 558, pp. 203–211.

*Primary Examiner*—Edward P. Westin
*Assistant Examiner*—John R. Lee
*Attorney, Agent, or Firm*—Finnegan, Henderson, Farabow, Garrett & Dunner

[57] ABSTRACT

In an image reading method, an image of an original document is read at a plurality of positions within one period in a manner that the focal position spaced a specific distance apart from the surface of the original document is periodically varied while being moved in the slow scan direction. The plurality of read positions during one period are synchronized every period. In-focus image data is detected from the image data read out during each period. Other image data than the detected in-focus image data during one period is replaced with the in-focus image data. Alternatively, blur of other image data than the detected in-focus image data during one period is corrected on the basis of the in-focus image data. An image reader based on the image reading method is also disclosed.

20 Claims, 6 Drawing Sheets

Mode-1 : NORMAL OPERATION

Mode-2 : REDUCED AMPLITUDE OPERATION

1

IMAGE READER AND IMAGE READING METHOD

BACKGROUND OF THE INVENTION

1. Field of the Invention

The present invention relates to an image reader using a contact image read sensor, which gathers two-dimensional document image data by scanning an image on an original document with an image read unit having an array of one-dimensional image read elements, with the translating motion of the read unit relative to the original image. More particularly, the invention relates to an image reader capable of properly handling the out-of-focus caused by the irregularities and coming-up of the document surface, and an image reading method for the image reader.

2. Discussion of the Related Art

In some of the image readers each using a contact image read sensor, a one-dimensional rod lens array is used for the image-forming optical system. The image reader of this type in which a one-dimensional rod lens array is used for the image forming optical system, will be described with reference to FIG. 10 showing an external view of a conventional image reader.

The image reader, as shown in FIG. 10, is made up of an image read unit 1 having an image sensor for reading an image from an original document, a drive mechanism 2 for moving the read unit 1, a drive shaft 3 for allowing the movement of the read unit 1 by the drive mechanism 2, an image processor board 4 having an image processor circuit thereon for processing image signals from the image sensor of the read unit 1 for the gray level adjustment, tone characteristic correction, digitizing the image signals as required, and the like, and a platen cover 5 to be set on an original document located on a platen glass to keep it flat.

The original, held by the platen cover 5, is scanned by the image read unit 1, to read out the image of one line. The read unit 1 is rectilinearly moved in the slow scan direction under control of the drive mechanism 2. Subsequently, the image of the next line is read out of the document surface. The image signals read out by the read unit 1 are processed in the form of read image data by the image processor board 4.

The details of the construction of the image read unit 1 will be described with reference to FIG. 11. FIG. 11 is a sectional view showing a conventional read unit of the image reader of FIG. 10.

The conventional image read unit 1 includes an optical system and an image read system. The optical system is made up of a light projector 11, contained in a carriage case 10, for projecting light onto an original document 7 located on a platen glass 6, and a rod lens array 12, consisting of an array of rod lenses, for receiving an image of reflected light from the original document 7 and forming an image of the reflected light on a sensor array 13. The image read system is made up of the sensor array 13 which consists of an array of photo sensors, a sensor array mounting board 14 having the sensor array 13 mounted thereon, a signal processor board 15 for reading image signals output from the sensor array 13 and time-sequentially outputting the image signals to the image processor board 4, and an IR cut filter 16, located between the optical system and the read system, for cutting off infrared rays.

The original document 7 is positioned in place by the platen cover 5 and the platen glass 6. To this position of the original document 7, the focal position of the optical system is adjusted in connection with the relative positions of the surfaces of the rod lens array 12 and the sensor array 13, in a factory.

The depth of field of the rod lens array 12, which is used in association with the contact sensor array 13, is approximately 1 mm at most. This figure is insufficient for the required depth of field of the image reader. The image-bearing surface of the original document to be placed on the platen glass is not always flat. The stitched portion of a spread book is not flat. Some documents, such as documents having three-dimensional objects bonded thereto and documents having creases, have uneven surfaces. When this type of document is set in the image reader of the fixed focal position, and an image thereon is read out by the image reader, the read-out image is partially blurred. Accordingly, an unsatisfactory readout image can be obtained.

To cope with the out-of-focus problem, attempts to improve the rod lens array have been made. The results of the improvement are still unsatisfactory. When considering the fact that the depth of field of the rod lens array is shallow, there is possibly a theoretical limit in improving the out-of-focus problem of the image reader of the type in which the rod lens array is used for an imaging optical system.

In connection with this problem, another proposal has been made, in which the focal position is directly varied in synchronism with the image read operation, thereby obtaining a better image. In the image reader disclosed in Japanese Patent Unexamined Publication No. Sho. 59-36477 (conventional example 1), one scan line is divided into 10 number of segmental scan lines. The readout signal is sampled and held to form a histogram. The histogram is used for obtaining exact image data.

In the optical information reproducing system disclosed in Japanese Patent Unexamined Publication No. Hei. 4-40746 (conventional example 2), the best focal position is secured by moving the read means of the image sensor along the path of the light beam reflected from the surface of an original document. To this end, predetermined lines are provided on both ends of the document. The read means is controlled using the read signals of the lines.

In the image reader of the conventional example 1, a read head is vertically vibrated at frequency of 10 KHz for one scan line of 0.2 mm width. This cannot satisfy the pixel density (16 lines/mm to 32 lines/mm) required at the present stage. The image is picked up in a sample/hold manner. When the vertical motion for image reading is divided by 10, read elements must be operable at a speed 1/10 as high as a normal speed, viz., a high speed multiplied by the dividing number. It is very difficult to realize such read elements by the present technology.

In the optical information reproducing system of the conventional example 2, the reference lines must be provided on the readout image. This restricts the image reading operation. The control for the focal position adjustment properly functions in the image area including the reference lines extending in the slow scan direction. In the fast scan direction, only the fixed reading operation functions. Accordingly, when reading an original document of which the surface is irregular in the central portion, the readout image is unsatisfactory in quality.

SUMMARY OF THE INVENTION

The present invention has been made in view of the above circumstances and has an object to provide an image reader which controls the read means so as to obtain the best focal position even when it reads an image from an original document of which the surface is partially irregular.

Another object of the present invention is to provide an image reading method for the image reader.

In attaining the above object, the invention provides an image reader including periodic varying means for periodically varying a focal position spaced a specific distance apart from a surface of an original document, moving means for moving the periodic varying means in a slow scan direction, and detecting means for detecting in-focus image data from image data read at a plurality of positions during one period of the periodic motion for varying the focal position.

Further, the invention provides an image reading method including the steps of reading an image of an original document at a plurality of positions within one period in a manner that a focal position spaced a specific distance apart from a surface of the original document is periodically varied while being moved in a slow scan direction, the plurality of read positions during one period being synchronized every period, and detecting in-focus image data from image data read out during each period.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

The preferred embodiments of the present invention will be described with reference to the accompanying drawings. To be brief, an image reader of the invention includes a periodic varying mechanism for periodically varying the focal position and an image processor operated in combination with the periodic varying mechanism. The image processor processes input image signals for correcting pixel groups locally present on the document surface.

Figure 1:
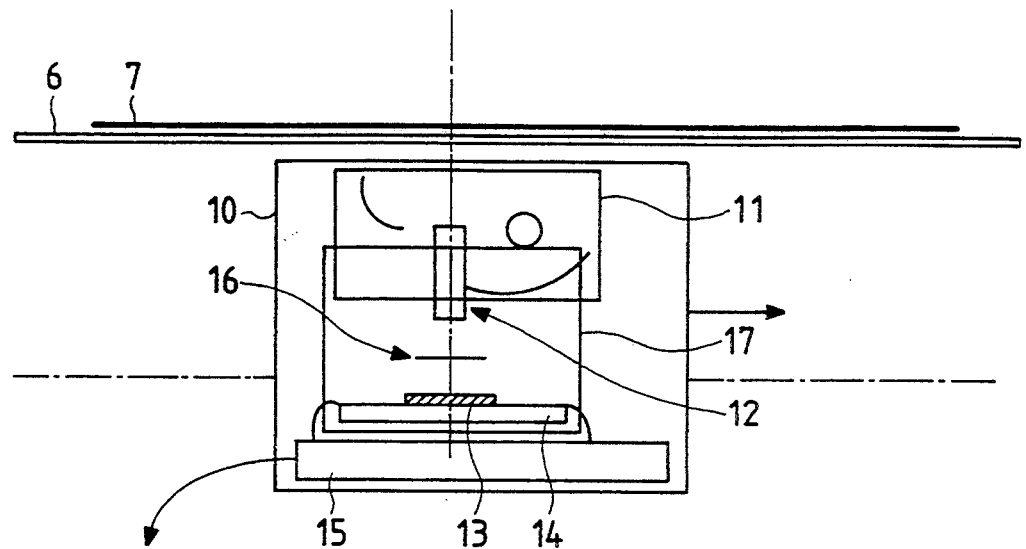
FIG. 1 is a sectional view showing an image read unit according to an embodiment of the present invention.
Figure 10:
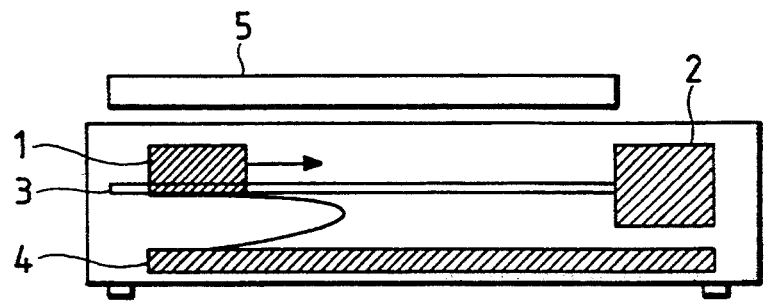
FIG. 10 is an external view of a conventional image reader.
Figure 11:
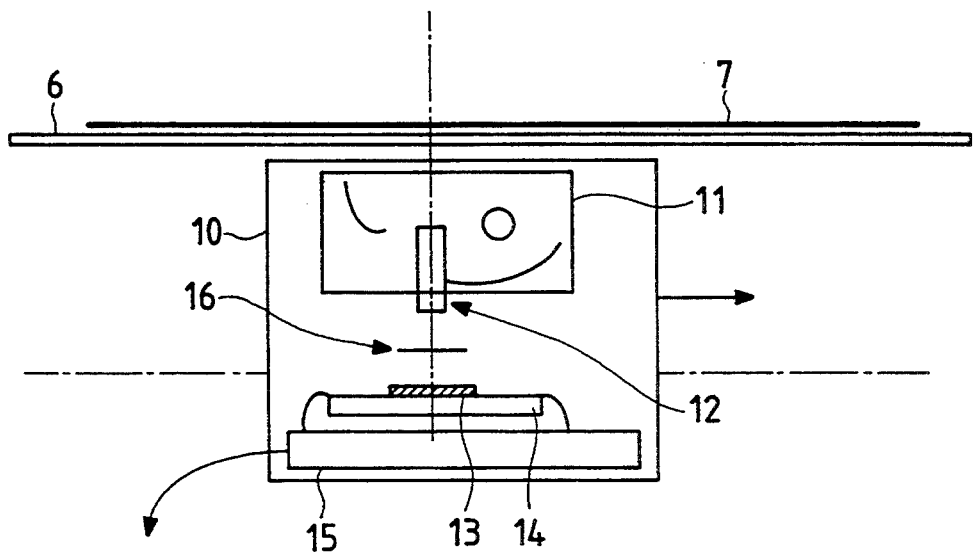
FIG. 11 is a sectional view showing a conventional image read unit of the image reader of FIG. 10.

FIG. 1 is a sectional view showing an image read unit according to an embodiment of the present invention. In the figure, like reference numerals are used for designating like or equivalent portions in FIG. 11 showing the conventional image reader. The image read unit of the first embodiment of FIG. 1 corresponds to the image read unit 1 of which the external view is illustrated in FIG. 10.

The image read unit 1 of the first embodiment includes an optical system and an image read system. The optical system is made up of a light projector 11, contained in a carriage case 10, for projecting light onto an original document 7 located on a platen glass 6, and a rod lens array 12, consisting of an array of rod lenses, for receiving an image of reflected light from the original document 7 and forming an image of the reflected light on a sensor array 13. The image read system is made up of the sensor array 13 which consists of an array of photo sensors, a sensor array mounting board 14 having the sensor array 13 mounted thereon, a signal processor board 15 for reading image signals output from the sensor array 13 and time-sequentially outputting the image signals to the image processor board 4, and an IR cut filter 16, located between the optical system and the read system, for cutting off infrared rays. The image read unit 1 further includes a sub-unit 17 as the mechanism for periodically varying the focal position in the image read unit. The sub-unit 17 is essential to the present invention.

As shown, the sub-unit 17 contains the rod lens array 12, the IR cut filter 16, the sensor array 13, and the sensor array mounting board 14. The sub-unit 17 is mechanically driven to vertically vibrate along the optical axis. In this case, those components housed in the sub-unit 17 are also vibrated. To gain an easy vibration control, the sub-unit 17 contains an irreducible number of the components packed thereinto.

The sub-unit 17 vibrates at an amplitude of approximately 2 to 3 mm and at periods each of several lines in the slow scan direction, with respect to the carriage case 10. In other words, the sub-unit 17 vibrating at this amplitude of 2 to 3 mm reads out an image of several lines for each period while the carriage case 10 is moved in the slow scan direction. The scanning operations for image reading are synchronized for each period. The distance of it to the original document 7 is fixed for each scan of each period. Accordingly, a drive unit (not shown) for causing a vibration so as to periodically vary the focal position synchronously for each line of each period, is contained in the carriage case 10.

More specifically, the sub-unit 17 contains the sensor array 13 and the rod lens array 12 which are shaped linearly in the fast scan direction. Accordingly, the sub-unit 17 per se is also shaped linearly in the main scan direction. A holder for holding both linear ends of the sub-unit 17 is vertically vibrated by the combination of a cam and a stepping motor or an ultrasonic motor, for example. The combination of the drive mechanism 2 and the drive shaft 3 moves the vertically vibrating sub-unit 17 so as to slow-scan the image of several lines, e.g., 5 lines, for each period of the vibration.

The image signals produced from the image read system through the above-mentioned operation contains out-of-focus information periodically every line for those several lines in the slow scan direction. Of those image signals of those lines, the image signal of at least one line represents a state being substantially focused if the image signals result from the image of the document of which the surface has an uneven part. The vibration of the sub-unit 17 at the amplitude of 2 to 3 mm makes the focal depth of the whole system deep, thereby eliminating the defect of the rod lens, i.e., the focal depth is shallow.

Figure 2:
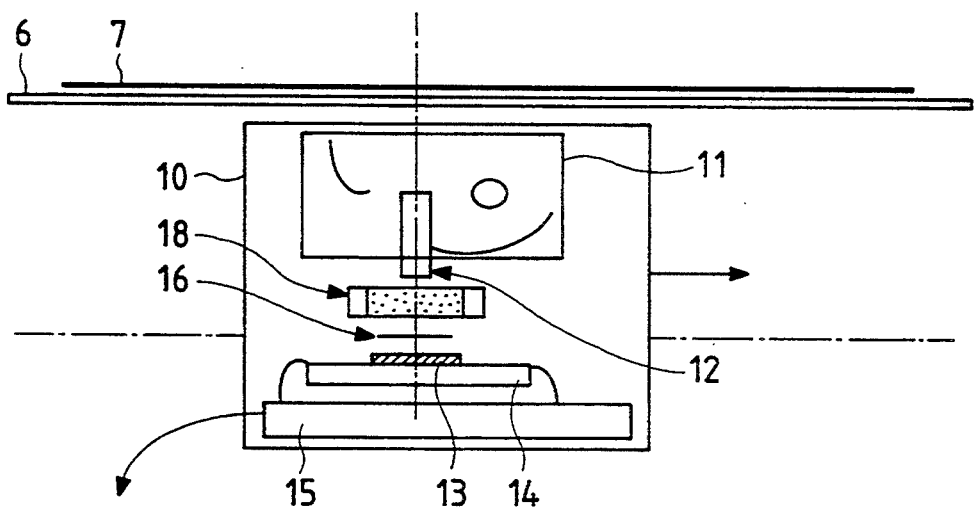
FIG. 2 is a sectional view showing an image read unit according to another embodiment of the present invention.
Figure 3:
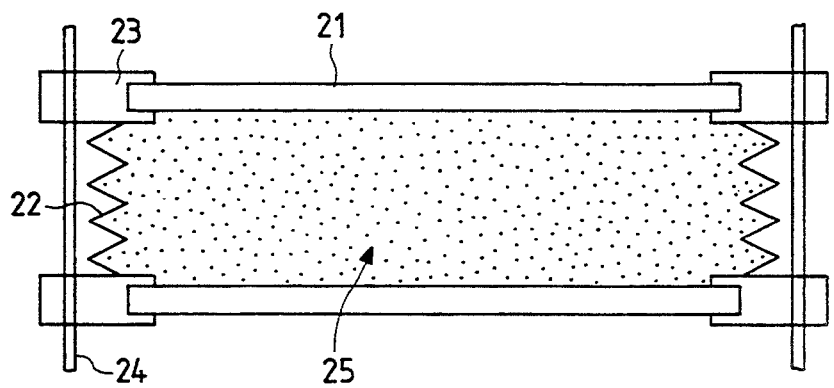
FIG. 3 is a sectional view showing a focal position varying unit used in the second embodiment of FIG. 2.

Another mechanism for periodically varying the focal position which is another embodiment of the present invention will be described with reference to FIGS. 2 and 3. FIG. 2 is a sectional view showing an image read unit according to another embodiment of the present invention. FIG. 3 is a sectional view showing a focal position varying unit used in the second embodiment of FIG. 2.

The basic construction of the image read unit of this embodiment is substantially the same as that of the image read unit of the first embodiment shown in FIG. 1. In the image read unit of FIG. 1, the sub-unit 17 is used for the mechanism 10 for periodically varying the focal position. In the image read unit of FIG. 2, a focal position varying unit 18 is used for the same purpose, in lieu of the sub-unit 17.

The focal position varying unit 18, located between the rod lens array 12 and the sensor array 13, functions to periodically vary the depth of field when the rod lens array forms an image on the sensor array. This unit periodically varies the focal position of the rod lens array.

A specific construction of the focal position varying unit 18 will be described with reference to FIG. 3.

As shown in FIG. 3 showing the focal position varying unit 18, two transparent members 21 made of optical glass, elongating in the fast scan direction, are disposed parallel to each other, with a uniform gap therebetween of approximately 4 mm. A bellows 22 is inserted between the transparent members 21. With use of the bellows, the distance between the transparent members 21 may be varied. The transparent members 21 and the bellows 22 are jointed by shields 23 as shown. The shields 23 are mounted on the shafts 24. A space defined by the two transparent members 21 and the bellows 22 is filled with liquid 25, e.g., silicon oil, having a refractive index and a spectral transmittance that are comparable with those of glass. The shields 23 prevents the liquid 25 from leaking from the space.

For the liquid 25 having a refractive index and a spectral transmittance that are comparable with those of glass, reference is made to Japanese Patent Unexamined Publication Nos. Hei. 2-10309, 4-11470, and 4-21832.

The shields 23 supporting the transparent members 21 are connected to a drive unit (not shown) for generating an electrically driven, small vibration (amplitude), such as an ultrasonic motor. When driven, the relative distance of one of the two transparent members 21 to the other is varied at specific periods. More specifically, the relative distance is varied so as to be synchronized with the slow-scan movement of the carriage case 10 every several lines. In this way, the optical focal position of the rod lens array is controlled at a desired period and a desired amplitude. With this construction, periodic out-of-focus states are intentionally created every several lines, and the mechanism for periodically varying the focal position is realized.

Where using the thus constructed mechanism for periodically varying the focal position, even when the image reader reads an image from an original document of which the surface includes an irregular portion, the unit of several lines surely contains such a line as to satisfy the in-focus state within a threshold value. Therefore, if the in-focus image data is picked up and properly processed by the image processor board 4, it is possible to obtain an image that is relatively deteriorated in resolution but suffers from less blur on the whole.

Next, an image processing method for transforming the image signals read by the image reader with the image read unit of FIG. 1 or FIGS. 2 and 3 into high quality image data, and some circuits for the image processing method, will be described.

In brief, high quality image data is formed by the image processing for replacing the image signals that are read while the focal position is periodically varied, with in-focus image signals or for properly correcting the readout image signals.

Figure 4:
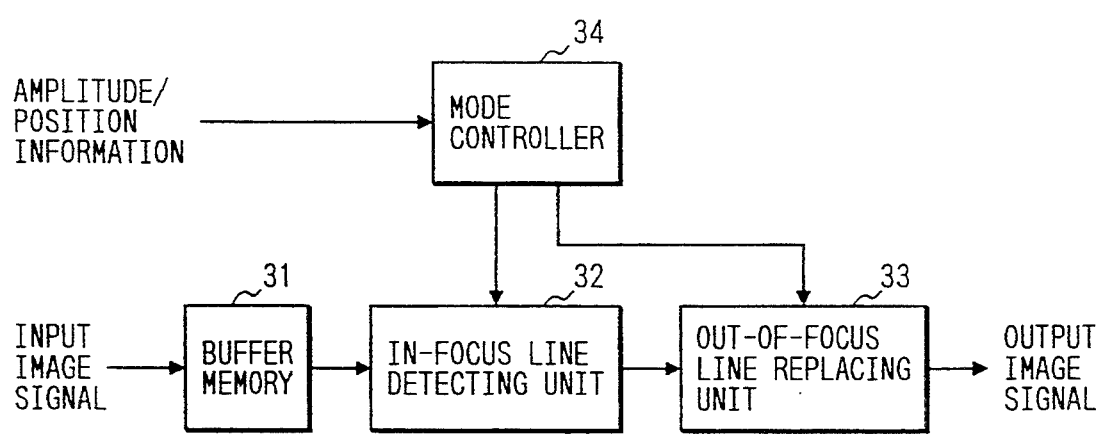
FIG. 4 is a block diagram showing a first image processing circuit based on the image data replacement.

The image processing for the image signal replacement will be described with reference to FIG. 4. FIG. 4 is a block diagram showing an image processing circuit based on the replacement (first image processing circuit).

The first image processing circuit of FIG. 4 is made up of a buffer memory 31 for storing input image signals in the form of image data every line, a mode controller 34 for outputting an instruction to specify a plurality of lines corresponding to one period on the basis of vibration/position information, an in-focus line detecting unit 32 for calculating variances of the image data of specific lines every line and detecting the line having the largest variance, and an out-of-focus line replacing unit 33 for replacing other lines (out-of-focus lines) of the detected image data for one period with the in-focus line.

The mode controller 34 outputs an instruction (range specifying instruction) to specify a plurality of lines corresponding to one period on the basis of vibration/position information, to the in-focus line detecting unit 32 and the out-of-focus line replacing unit 33. The in-focus line detecting unit 32 calculates variances of the image data within the lines of the specified range to detect the in-focus line. The out-of-focus line replacing unit 33 replaces other lines (i.e., out-of-focus lines) than the in-focus line within the lines of the specified range, and produces image signals.

The process of replacing the image signals will be described more specifically. An image data processing on the data block of N x M pixels is repeated where N indicates several lines obtained through the periodic variation of the focal position, and is 5 lines, for example, and M indicates the number of pixels obtained by properly dividing the image over the N number of lines in the slow scan direction, and is 32 pixels, for example. The image data of one line having the best in-focus state is picked up. The image data of other lines (N−1) than the line having the best in-focus state are replaced with the image data of the latter line.

The algorithm required is the algorithm for detecting the in-focus line by the in-focus line detecting unit 32. This algorithm can be realized by the following calculation.

For the data block of N x M pixels, a variance of M pieces of the pixel data (representing luminance) is calculated for each line. When the variances of the image data on a specific point and its nearby image area are calculated, the line having the largest variance is in the best in-focus state since the image obtained in the best in-focus state is the clearest.

Accordingly, the in-focus line detecting unit can be realized as desired by designing a circuit for calculating an N number of variances and comparing them. After the in-focus line is detected, the image data of the remaining (N−1) lines (out-of-focus lines) are replaced with the image data of the in-focus line by the out-of-focus line replacing unit 33, and the resultant image data is output.

As described above, in the image reader using the first image processing circuit and an image reading method for the circuit, the out-of-focus image data is replaced with the in-focus image data. Accordingly, the resolution of the image in the slow scan direction is relatively deteriorated, but the image data has less blur on the whole.

In some types of image data, an excellent image is obtained without replacing the image data sampled for one period with the in-focus image data. Accordingly, the image processing circuit may be arranged so as to designate a mode for the replacement of the image data or a mode for nonreplacement.

Figure 5:
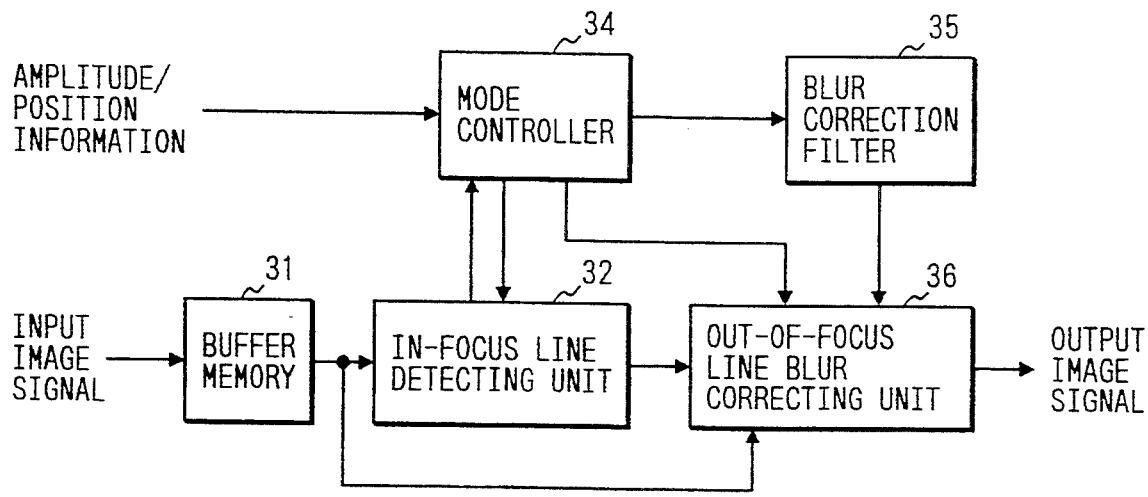
FIG. 5 is a block diagram showing a second image processing circuit based on blur correction.

An image processing circuit (second image processing circuit) shown in FIG. 5 will be described. FIG. 5 is a block diagram showing the second image processing circuit based on blur correction.

The second image processing circuit of FIG. 5 is made up of a buffer memory 31 for storing input image signals in the form of image data every line, a mode controller 34 for outputting an instruction to specify a plurality of lines corresponding to one period on the basis of vibration/position information, an in-focus line detecting unit 32 for calculating variances of the image data of specific lines every line and detecting the line having the largest variance, an out-of-focus line blur correcting unit 36 for correcting the blur of other lines (out-of-focus lines) by the detected image data, and a blur correction filter 35 for storing the quantities of the out-of-focus of the respective lines within one period when these lines are set to the in-focus lines from other lines, in the form of a table.

The difference of the second image processing circuit from the first image processing circuit shown in FIG. 4 resides in that the out-of-focus line blur correcting unit 36 and the blur correction filter 35 are used in lieu of the out-of-focus line replacing unit 33.

To be more specific, the blur correction filter 35 previously stores the displacements of other lines than a reference line from the reference line on the basis of the optical distance between an original document and the image read unit. When the in-focus line detecting unit 32 detects the in-focus line, the information on the in-focus line is transferred to the mode controller 34. The blur correction filter 35 receives information indicative of which line of those specified lines is the in-focus line, and uses the in-focus line as the reference line and reads out the blur quantities of the remaining lines, and outputs the blur quantities to the out-of-focus line blur correcting unit 36.

The out-of-focus line blur correcting unit 36 receives an instruction (range specifying instruction) for specifying a plurality of lines for one period from the mode controller 34, receives information on the in-focus line within that range from the in-focus line detecting unit 32, reads the amount of the image data within the range specified by the range specifying instruction from the buffer memory 31, uses the in-focus line as the reference line and reads out the blur quantities of the remaining lines, corrects the image data of other lines than the reference line by the blur quantities, and outputs the resultant image data as output image data.

To be more specific, the in-focus line is detected as in the first image processing circuit. After the in-focus line is detected, the out-of-focus quantities of the remaining lines of (N−1) can be known on the basis of the vibration/position information. The data from the blur correction filter 35 previously prepared on the basis of the out-of-focus quantities, are selectively applied to the lines of (N−1) by the out-of-focus line blur correcting unit 36, whereby obtaining the blur-corrected output image signals.

As described above, in the image reader using the second image processing circuit and an image reading method for the circuit, the image data of the out-of-focus lines are corrected by the blur quantities that are previously stored in the blur correction filter 35 using the image data of the in-focus line as a reference. The resultant image data is free from blur, with an excellent resolution in the slow scan direction.

Figure 6:
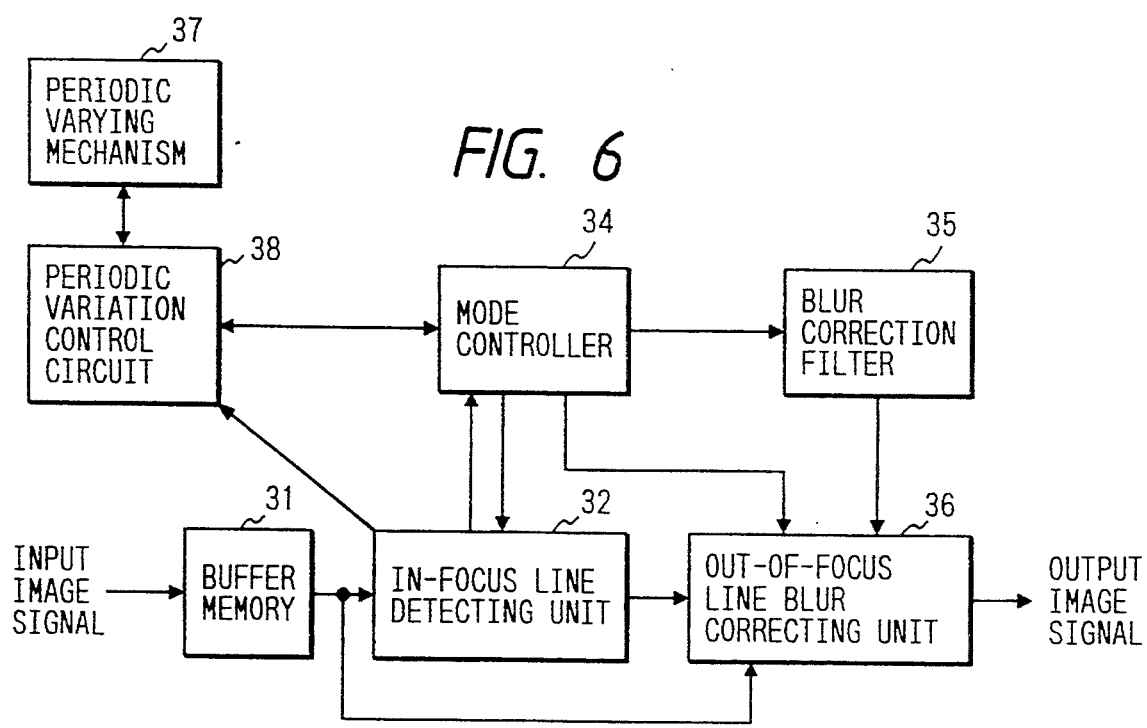
FIG. 6 is a block diagram showing a third image processing circuit based on blur correction, which uses a periodic variation control circuit.

Next, an image processing circuit (third image processing circuit) shown in FIG. 6 will be described. FIG. 6 is a block diagram showing the third image processing circuit based on the blur correction, which uses a periodic variation control circuit.

The third image processing circuit is constructed on the basis of the second image processing circuit of FIG. 5. The third image processing circuit contains a periodic variation control circuit 38 for controlling a periodic varying mechanism 37 in accordance with information from the in-focus line detecting unit 32.

To be more specific, the periodic varying mechanism 37 periodically moves the image read unit shown in FIG. 1 or 2 in the vertical direction. The mechanism includes a motor, a cam and the like. The periodic varying mechanism 37 is capable of varying the amplitude of the periodic motion at specific distances from an original document under control of the periodic variation control circuit 38. The periodic varying mechanism 37 can vary the amplitude of the periodic motion at several steps. Further, the mechanism 37 varies the amplitude at a position near to the focal position in accordance with information indicative of the focal position (information of the in-focus line) from the periodic variation control circuit 38.

The periodic variation control circuit 38 picks up vibration/position information from information of motor speed and the like in the periodic varying mechanism 37, and transfers it to the mode controller 34, receives information of in-focus line that the line detecting unit 32 detects within the range specified by a range specifying instruction from the mode controller 34, and controls to vary the central position of the periodic motion (central position of the amplitude) of the periodic varying mechanism 37 and the width of the periodic motion (amplitude).

Figure 7A:
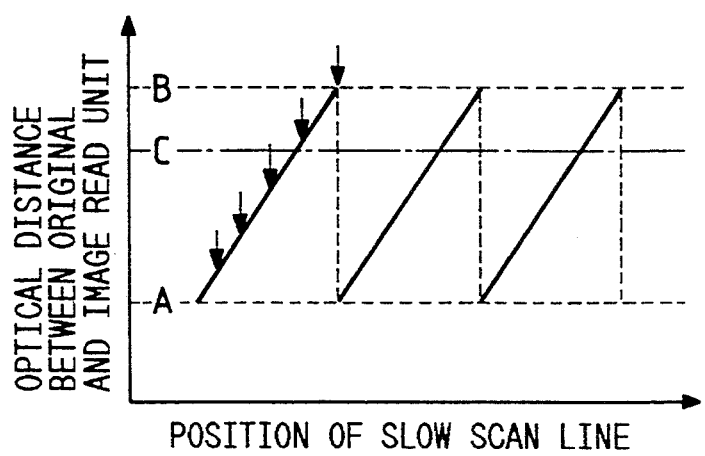
FIG. 7(a) is a graph showing Mode-1 of the control by a periodic variation control circuit in the third image processing circuit of FIG. 6.
Figure 7B:
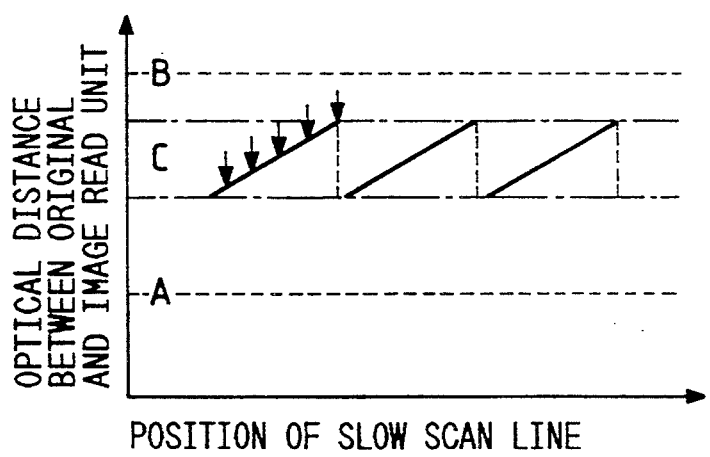
FIG. 7(b) is a graph showing Mode-2 of the control by the periodic variation control circuit.

The control by the periodic variation control circuit 38 will be described with reference to FIGS. 7(a) and 7(b). In the description to follow, it is assumed that the image of five lines is read for one period. An operation mode in which the distance between an original document and the image read unit varies at an amplitude within the range of A to B (about 2 mm) for 2 or 3 seconds is called Mode-1. In this Mode-1, if the in-focus line detecting unit 32 detects an in-focus line near position C, the periodic variation control circuit 38 receives information of the in-focus line (indicating that the focal position lies at near to position C), and controls the periodic varying mechanism 37 so that the amplitude of the variation is reduced and the center of the variation is set at near to position C as shown in FIG. 7(b) (This operation mode is called Mode-2). In addition, position A indicates a standard case where the focal position is coincident with the platen position.

In Mode-2, the periodic varying mechanism 37 causes a small vibration at a position near to the focal position. Through the vibration, the image of 5 lines is read out of the document. The detection of the in-focus line (detection of the focal position) is more exact. Further, the device operates so as to detect the in-focus line within the range of the amplitude. Accordingly, the exactness of the detection of the in-focus line is further improved.

During the course of the periodic motion at the small amplitude at a position near to the focal position under drive control of the periodic varying mechanism 37, if the focal position suddenly gets out of the range as the result of scanning an irregular part of the document surface, the in-focus line detecting unit 32 cannot detect the in-focus line. The periodic variation control circuit 38 receives information indicating a detection failure of the in-focus line (in-focus line detection failure information) from the in-focus line detecting unit 32. In response to a signal representative of the in-focus line detection failure information, the periodic variation control circuit 38 returns the central position and the width of the periodic motion to the initial ones, viz., it sets up Mode-1.

In this way, the device can cope with a sudden change of the focal position owing to a change of the document surface level. The well-focussed image data can be obtained.

The control method of the periodic variation control circuit 38 will be described with reference to a flowchart shown in FIG. 8.

To start, the setting of the period and amplitude of the periodic motion is initialized (step 100). In this initializing step, the amplitude for Mode-2 as well as that for Mode-1 is set, and a total number of scans is also set.

Then, the periodic varying mechanism 37 is operated in Mode-1 (step 101). The periodic variation control circuit 38 checks whether or not the in-focus line is detected, using in-focus line information from the in-focus line detecting unit 32 (step 102). When the in-focus line is detected, the periodic varying mechanism 37 is operated in Mode-2 (step 103). The transition of the operation mode to Mode-2 is carried out after two periods (two waves) from the detection of the in-focus line. This delay is caused by the circuit delay.

If the in-focus line is not detected (step 102), a check as to whether or not a predetermined number of scans is reached is made (step 104). If it does not reach yet, the system control returns to step 101. In this step, the scan of Mode-1 is performed. The process continues till the preset number of scans is reached. After Mode-2 is set up (step 103), a check as to whether or not a predetermined number of scans is reached is made (step 105). If it does not reach yet, the system control returns to the step 102. The process continues till the predetermined number of scans is reached.

The simplest example of the control of the periodic variation control circuit 38 has been described above. In another example of the control, a specific number of periods is preset for Mode-1 and Mode-2. This preset number of periods are used as a block. The operation mode is changed from Mode-1 to Mode-2 when one block, i.e., the preset number of periods, terminates. This control provides less variation of the focal position and a stable readout image. The system designed such that the focal position is detected at the first period of one block (three periods), and the detection result is used in two blocks (four periods), eliminates the complexity of the operation caused by the circuit delay, and enables the control of the circuit to be readily realized.

As described above, in the image reader using the third image processing circuit and an image reading method for the circuit, in case where information on the distance to an original document or where the focal position is lost from the control procedure, it is operated in the standard periodic variation mode, and during the operation, if the focal position is detected, information of the focal position is fed back within several periods from the focal position detection, the variation mode of the narrow amplitude at a position near to the focal position is performed to detect the in-focus line, whereby making the blur correction. Therefore, the image quality deterioration of the image part picked up in the out-of-focus state caused by the operation of the periodic varying mechanism 37 is minimized.

In the above-mentioned embodiment, the blur correction filter 35 shown in FIG. 6 must have the correction values for the standard periodic variation (Mode-1) and the correction values for the small amplitude, periodic variation (Mode-2) as well.

Figure 8:
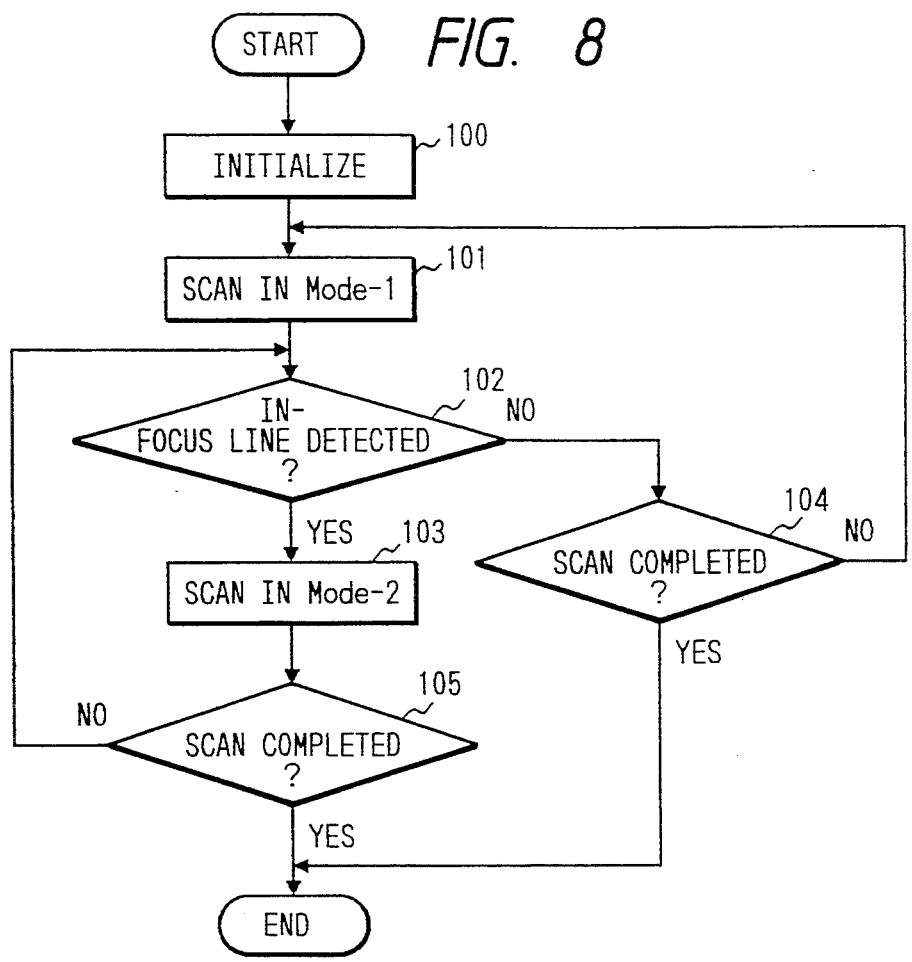
FIG. 8 is a flowchart showing a flow of the control by the periodic variation control circuit.

In the instance of FIGS. 7 and 8, the two operation modes are used for the variable control of the periodic varying mechanism 37. The number of operation modes may be further increased. If so, a more minute dynamic control is realized, so that the blur correction for the out-of-focus lines can be efficiently carried out.

The third image processing circuit of FIG. 6 is constructed on the basis of the second image processing circuit of FIG. 5, but may be constructed on the basis of the first image processing circuit of FIG. 4. The latter image processing circuit is illustrated, as a fourth image processing circuit, in FIG. 9 showing a circuit block diagram.

Figure 9:
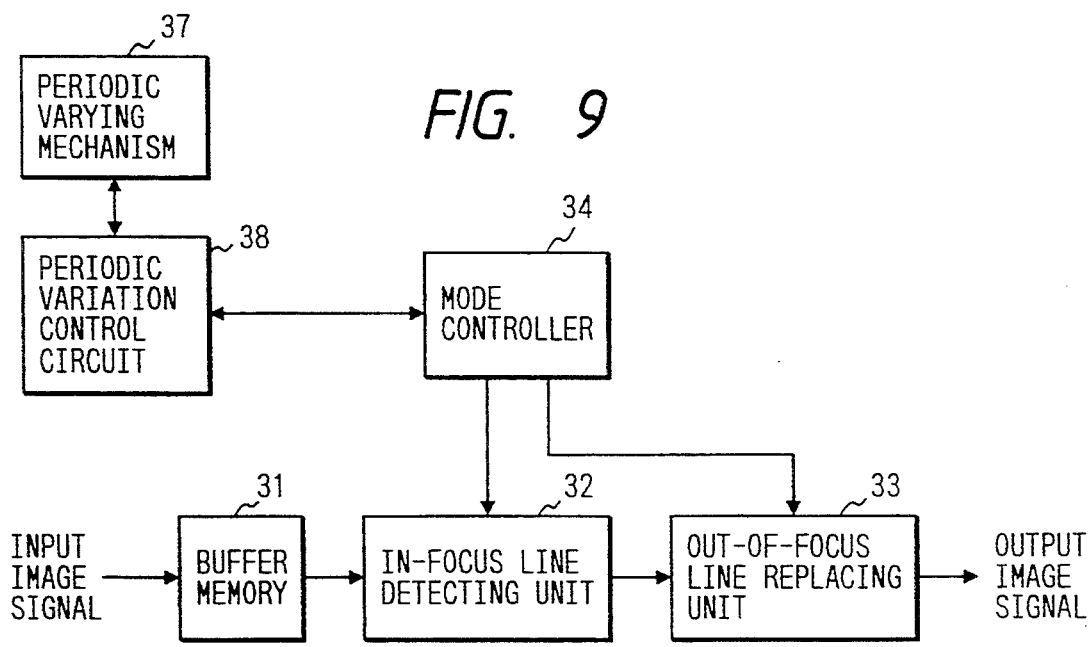
FIG. 9 is a block diagram showing a fourth image processing circuit.

The fourth image processing circuit, as shown in FIG. 9, is constructed such that through the control of the periodic varying mechanism 37 by the periodic variation control circuit 38, the in-focus line is detected at a position near the focal position, and the image data of other several lines are replaced with the image data of the in-focus line by the out-of-focus line replacing unit 33. While the resolution in the slow scan direction is a little deteriorated, other lines are replaced with the lines being substantially in an in-focus state, whereby the image data having little blur is obtained, and a high image quality is secured.

The third image processing circuit includes the periodic varying mechanism 37 and the periodic variation control circuit 38. For reading an image from an original document having the even surface, they are not required. In this case, a selecting switch may be used to disconnect the periodic varying mechanism and the periodic variation control circuit from the image processing circuit.

In the image reader and the image reading method according to the inventions, the focal position spaced a specific distance apart from the surface of an original document is periodically varied by periodic varying means, the periodic varying means is moved in the slow scan direction, the in-focus image data is detected from an image of the original document that is read at a plurality of positions within one period of the periodic variation, by the detecting means, and other image data than the in-focus image data during one period is replaced with the detected in-focus image data by the replacing means. Accordingly, the following useful effect is obtained: an image having little blur can be read out of the original document having an irregular part of the surface thereof since the image data read out of the irregular part of the document surface is replaced with the in-focus image data.

What is claimed is:

1. An image reader for reading an image on a document comprising:
   a lens between the document and an image plane, the lens having a focal position;
   periodic varying means for periodically varying one of the distance between the document and the lens, the distance between the image plane and the lens, and the focal position of the lens;
   moving means for moving one of the lens and the document relative to the other in a scan direction; and
   detecting means for detecting in-focus image data at the image plane.

2. The image reader according to claim 1, wherein the detecting means collects image data for one period of the periodic varying means, calculates variances in the image data during the one period, and detects the image data having the greatest variance as the in-focus image data.

3. The image reader according to claim 2, wherein the lens comprises a rod lens array and the detecting mean comprises a sensor array and wherein the periodic varying means comprises a sub-unit including the rod lens array, the sensor array, and a drive means for vertically moving the sub-unit in a periodic manner.

4. The image reader according to claim 1, wherein the periodic varying means comprises a focal position varying unit filled with a liquid having a refractive index and a spectral transmittance that are comparable with those of glass, the focal position varying unit being between the lens and the image plane, and varying means for varying the width of the focal position varying unit.

5. The image reader according to claim 1, further comprising replacing means for replacing other image data than the detected in-focus image data during one period with the in-focus image data.

6. The image reader according to claim 5, wherein said detecting means collects data for one period of the periodic varying means, calculates variances in the image data during the one period, and detects the image data having the greatest variance as the in-focus image data.

7. The image reader according to claim 5, wherein the lens comprises a rod lens array and the detecting mean comprises a sensor array and wherein said periodic varying means comprises a sub-unit including the lens and the image plane, and a drive means for vertically moving said sub-unit in a periodic manner.

8. The image reader according to claim 5, wherein the periodic varying means comprises a focal position varying unit filled with a liquid having a refractive index and a spectral transmittance that are comparable with those of glass, the focal position varying unit being between the lens array and the image plane, and varying means for varying the width of said focal position varying unit.

9. The image reader according to claim 1, further comprising correcting means for correcting out of focus blur of image data other than the detected in-focus image data during one period on the basis of the detected in-focus image data.

10. The image reader according to claim 9, wherein the detecting means collects data for one period of the periodic varying means, calculates variances in the image data during the one period, and detects the image data having the greatest variance as the in-focus image data.

11. The image reader according to claim 9, wherein the lens comprises a rod lens array and the detecting mean comprises a sensor array and wherein the periodic varying means comprises a sub-unit including the lens and the image plane, and a drive means for vertically moving the sub-unit in a periodic manner.

12. The image reader according to claim 9, wherein the periodic varying means comprises a focal position varying unit filled with a liquid having a refractive index and a spectral transmittance that are comparable with those of glass, the focal position varying unit being between the lens and the image plane, and varying means for varying the width of the focal position varying unit.

13. The image reader according to claim 9, wherein the correcting means comprises memory means for storing quantities of blur at positions of image data other than the in-focus image data detected by the detecting means during one period on the basis of the position of the in-focus image data, and blur correcting means for correcting other image data than the in-focus image data detected by the detecting means during one period by the quantities of blur.

14. The image reader according to claim 9, further comprising periodic variation control means for varying the variation of said periodic varying means on the basis of the position of the in-focus image data within one period that is detected by said detecting means.

15. The image reader according to claim 14, wherein when said detecting means the in-focus image data, the variation of said periodic varying means is reduced with respect to a position near to the position of the in-focus image data.

16. The image reader according to claim 15, wherein when said detecting means does not detect image data having at least a minimal variance, the reduced variation of the periodic varying means is returned to the original variation.

17. The image reader according to claim 14, wherein the periodic variation control means controls the periodic varying means so that the periodic varying means does not vary the focal position.

18. An image reading method comprising the steps of:
   reading an image of a document using a lens between the document and an image plane;
   periodically varying one of the focal position of the lens, the distance between the lens and the document, and the distance between the lens and the image plane;
   moving one of the documents and the lens relative to the other; and
   detecting in-focus image data at the image plane.

19. The image reading method according to claim 21, further comprising the step of replacing image data other than the detected in-focus image data with the in-focus image data.

20. The image reading method according to claim 18, further comprising the steps of detecting out of focus image data and correcting the out of focus image data on the basis of the in-focus image data.

* * * * *

UNITED STATES PATENT AND TRADEMARK OFFICE
CERTIFICATE OF CORRECTION

PATENT NO. : 5,446,276
DATED : August 29, 1995
INVENTOR(S) : Tetsuo IYODA et al.

It is certified that error appears in the above-indentified patent and that said Letters Patent is hereby corrected as shown below:

Claim 3, Column 11, line 37, "mean" should read --means --.

CLAIM 7, COLUMN 11, LINE 61 AND

CLAIM 11, COLUMN 12, LINE 18,

"mean" SHOULD READ --means--.

Signed and Sealed this

Seventeenth Day of September, 1996

Attest:

BRUCE LEHMAN

Attesting Officer

Commissioner of Patents and Trademarks